United States Patent [19]

Joedicke

[11] 4,359,505

[45] Nov. 16, 1982

[54] LIGHT COLORED ROOFING GRANULES

[75] Inventor: Ingo B. Joedicke, Hedgesville, W. Va.

[73] Assignee: GAF Corporation, New York, N.Y.

[21] Appl. No.: 233,343

[22] Filed: Feb. 11, 1981

[51] Int. Cl.³ .............................................. B32B 19/04
[52] U.S. Cl. .................................. 428/404; 428/145; 428/403; 106/84; 106/286.8; 106/306; 423/395; 423/396; 427/219
[58] Field of Search ................... 428/404, 403, 145; 252/186; 106/84, 286.8, 306; 423/395, 396, 397; 427/219

[56] References Cited

U.S. PATENT DOCUMENTS

| | | | |
|---|---|---|---|
| 2,081,609 | 5/1937 | Teetor | 428/145 |
| 2,379,358 | 6/1945 | Jewett | 106/84 X |
| 3,255,031 | 6/1966 | Lodge | 428/145 |
| 3,479,201 | 11/1969 | Sloan | 428/145 |

*Primary Examiner*—George F. Lesmes
*Assistant Examiner*—Alexander S. Thomas
*Attorney, Agent, or Firm*—James Magee, Jr.; Joshua J. Ward; J. Gary Mohr

[57] ABSTRACT

Roofing granules coated with insolubilized reaction product of a coating composition comprising water, kaolin clay, sodium silicate, titanium dioxide and ammonium nitrate or nitrate of one or more group 1A metals.

10 Claims, No Drawings

LIGHT COLORED ROOFING GRANULES

BACKGROUND OF THE INVENTION

Roofing granules are extensively used in roll roofing and asphalt shingle compositions. Such granules are generally embedded in the asphalt coating on the surface of an asphalt impregnated base material such as roofing felt with the granules thus forming a coating that provides an adherent weather resistant exterior roofing surface. As the outer granule coating also provides the aesthetic effect observable with respect to the roof to which the roofing material is applied, the appearance of the granules is of major marketing importance. For this reason, a pigmented color coat is ordinarily applied to the base mineral granules to enhance their visual decorative effect.

Kaolin clay is used extensively in silicate paint formulations for coloring roofing granules. It serves as a filler, extender, moisture release agent and reactant to aid film insolubilization during high temperature firing. Although clay is a major component of such coating formulations, it alone lacks the brightness and opacity needed to hide the dark underlying base rock of the granule. Although kaolin clay consists mainly of alumino silicates, other constituents are present as a result of the clays natural origin. Iron and titanium impurities, for example, impart a buff or yellow color to the clay while organic impurities such as humic acid derivatives cause a grey coloration observed in sedimentary kaolin. Unbound iron in the form of extraneous Fe (III) minerals also causes discoloration. For these reasons, white colored roofing granule coatings using natural kaolin clay frequently require appreciable amounts of expensive $TiO_2$ to achieve desired color specifications.

White or light colored roofs are particularly favored in many areas. Titanium dioxide pigment is commonly used in the production of such white or light colored roofing granules. The $TiO_2$ is commonly used in conventional insolubilized alkali silicate coatings, such as those described in U.S. Pat. Nos. 2,379,358 to Jewett, 3,255,031 to Lodge et al, 3,479,201 to Sloan, etc. As mentioned above, the kaolin clay which is frequently used in such coatings contains impurities such as iron, titanium and humic acid which tend to discolor the clay. Organic impurities, in particular, cause the clay to darken upon exposure to high temperature. This requires the use of larger amounts of $TiO_2$ than would otherwise be necessary or desirable.

Various methods are known for increasing the brightness of kaolin clay. These include oxidation and/or reduction bleaching and high temperature calcining. Such methods are expensive. High temperature calcining, has a further disadvantage of producing clay which is unreactive toward silicate and therefore unsuitable for use in roofing granule coatings that are designed to cure by heat treatment alone. In addition, known techniques for brightening kaolin clay involve a separate treatment of the clay which would add a completely separate and unnecessary step to the normal roofing granule manufacturing process. Oxidation bleaching of kaolin using bleaching agents such as hypochlorite, ozone, chlorates, peroxides, perchlorates or perborates are among the known techniques for lightening kaolin clay by destroying discoloring organic impurities. All of these methods, however, substantially increase the cost of the clay.

SUMMARY OF THE INVENTION

It is an object of the invention to provide novel aqueous coating compositions useful for coating roofing granules as well as roofing granules produced using such coatings.

Aqueous coating compositions of the invention which are useful for coating roofing granules comprise:

(a) water;
(b) kaolin clay;
(c) sodium silicate;
(d) titanium dioxide; and
(e) bleaching agent selected from the group consisting of ammonium nitrate or nitrate of one or more group 1A metals.

Roofing granules of the invention comprise base mineral granules having coatings comprising insolubilized reaction product of the coating compositions of the invention.

DETAILED DESCRIPTION OF THE INVENTION

Whereas the various known oxidation bleaching processes described above are designed to improve the whiteness of kaolin clay as part of its production, the present invention uses in situ clay bleaching during the process of manufacturing coated roofing granules in which natural kaolin clay is used as a raw material. In this situation, the in situ bleaching is really a reduction of the darkening normally exhibited by clay at the temperatures normally used in the manufacture of coated roofing granules of the type described above. Since the kaolin clay in the coating is made whiter by this bleaching process, the demand for expensive $TiO_2$ pigment is significantly reduced.

In ordinary commercial clay purification, oxidation bleaching is generally conducted in a slurry phase as a separate manufacturing procedure, whereas in this invention the mild bleaching agent used is introduced during mixing of the silicate coating formulation and thus becomes part of the granule coating formulation. The actual bleaching occurs during firing of the coating following removal of water. This introduces no additional manufacturing procedures or expenses other than the cost of the mild oxidizing agent itself.

As noted above, the oxidizing or bleaching agent used in coating formulations of the invention is ammonium nitrate or nitrate of one or more group 1A metals. Such mild oxidizing agents are not normally used for clay bleaching because of the high temperatures needed for them to be active. However, roofing granule manufacture employs high temperature kiln firing with temperatures on the order of 1000° F. being commonly used to insolubilize the silicate coating. Under these conditions, the mild oxidizing agents of the invention are sufficiently reactive to be effective bleaching agents without significantly affecting granule color coat quality. By contrast, stronger oxidizing agents frequently discolor the coating.

Of the mild bleaching agents specified for use in the invention, sodium nitrate is a preferred bleaching agent. Ammonium nitrate is also completely satisfactory and generally somewhat cheaper than sodium nitrate, however, the use of ammonium nitrate will generally necessitate special provisions for control of ammonia fumes.

Base mineral granules for use in the invention may be of any of the conventional type granules normally used in the manufacture of roofing materials. Such granules may, for instance, be of material such as greenstone, nephylene syenite, common gravel slate, gannister, quartzite, greystone, etc. Granules are frequently used in a size range between about 10 and about 35 mesh, i.e. particle size which will pass through a 10 mesh screen but be retained on a 35 mesh screen. The use of larger and smaller granules is, however, within the scope of the invention.

Kaolin clay for use in the invention may be of any of the conventional hydrated kaolin clays used in granule coatings of the type discussed herein and are usually present in amounts between about 45 and about 65 wt % based on total coating on a dry basis. Conventional silicates are likewise suitable and are usually present in amounts between about 30 and about 40 wt % on the same basis. Titanium dioxide is normally used in amounts between about 1 and about 5%, based on total dry weight of coating composition. Other conventional ingredients such as ultramarine blue tint may also of course be used.

In practicing the invention, it is generally preferred that the mild oxidizing agent, i.e. ammonium nitrate or nitrate of one or more group 1A metals or mixtures thereof, be used in amounts between about 1 and about 4 wt % based on the amount of kaolin clay in the coating composition. Larger amounts tend to cause excessive yellowing and are not more effective in bleaching the clay. Water is used as desired to provide the desired viscosity for coating with aqueous coating compositions of the invention generally comprising between about 40 and about 60 wt % solids based on total aqueous composition.

Suitable nitrates of group 1A metals include lithium nitrate, sodium nitrate, potassium nitrate, rubidium nitrate and cesium nitrate as well as mixtures thereof with sodium nitrate being preferred.

In general, coating compositions of the invention are, except for the addition of a mild oxidizing agent as described herein, prepared and used in a conventional manner to coat roofing granules. As in the preparation of conventional roofing granules, the roofing granules of the present invention are prepared using any suitable base raw mineral granules, such as greenstone or nephylene syenite. In the conventional production of artificially colored roofing granules, an alkali metal silicate-clay coating is applied to the base mineral granules and fired to produce a moisture permeable, substantially water insoluble, durable, pigmented coating on the base mineral granules. In one method, referred to as the continuous paint slurry process, crushed and screen graded mineral granules are constantly mixed with a paint slurry containing pigment, clay and sodium silicate in suitable mixing equipment. The thus color coated granules are then heated to a temperature that may range from about 600° to about 1200° F. in a rotary-type kiln. Dehydration of the silicate occurs, and an extremely hard color-coated granule is obtained. In the event that the granules are fired at lower temperatures, e.g. about 500° F., the silicate-clay coating may require treatment by the addition of a pickling agent, such as $AlCl_3$ solution, in order to properly insolubilize the coating. Upon cooling, the color coated granules are generally post treated with suitable processing oils and/or coating compositions as is known in the art. The oxidizing agents called for by the invention may be added to the coating composition along with the other ingredients thereof in any desired order, although it is frequently preferred to add the oxidizing agent before adding the sodium silicate for additional ease in dissolving the nitrate used as the oxidizing agent. Granules may be coated in one or more coats with any desired amount of coating material. Use of between about 90 and about 120 pounds of coating per ton of granules on a dry basis is preferred. In a particularly preferred embodiment of the invention and in accordance with conventional practice, two separate coating materials are preferably used with the innermost coating comprising between about 50 and about 70 pounds per ton of granules on a dry basis and containing little or no titanium dioxide and no bleaching agent. The outer coating is preferably used in an amount of about 45 and about 60 pounds per ton of granules on a dry basis and contains $TiO_2$ and oxidizing agent. Also in accordance with normal practice, granules coated with coating compositions of the invention are preferably fired at temperatures between about 900° and 1100° F. to insolubilize the silicate coatings.

The following example is intended to illustrate the invention without limiting the scope thereof.

EXAMPLE

In order to test the effectiveness of sodium nitrate as a bleaching agent for kaolin clay in the production of fired roofing granules of the invention, four different samples of roofing granules were prepared. To insure that these samples would be identical except for the composition of the second coating, first coat granules prepared in a commercial granules plant were used. Each sample of granules was then coated with one of the second coat formulations described in Table I. The granules were then dried and heated in a kiln to 950°–1000° F. to completely insolubilize the coating. The fired granules were then cooled and coated with oil in a conventional post treatment to reduce dust and improve asphalt adhesion. Samples of the cooled granules were tested for "Hunter color L", a conventional test in which the L value measures lightness with an L value of 100 being perfectly white. Results of these tests are shown in Table I.

TABLE I

| | 2ND COAT COMPOSITIONS | | | |
| | Weight (gms.) | | | |
| Ingredient | No. 1 | No. 2 | No. 3 | No. 4 |
|---|---|---|---|---|
| $H_2O$ | 30 | 30 | 30 | 30 |
| $NaNO_3$ | — | — | 0.5 | 0.5 |
| Silicate* | 56 | 56 | 56 | 56 |
| Clay (water washed) | 25 | — | — | — |
| Clay (not water washed) | — | 25 | 25 | 25 |
| $TiO_2$ | 5 | 5 | 5 | 4 |
| Blue Tint | — | — | — | 0.05 |
| L Value  L: | 60.3 | 59.4 | 61.7 | 60.4 |

*wt ratio $SiO_2/Na_2O$ = 2.5, 41% solids

The inclusion of $NaNO_3$ clay bleaching agent, in sample No. 3 gave a much lighter product color even at the same $TiO_2$ pigment loading. Hunter lightness is even greater than Sample No. 1 suggesting that a reduction in $TiO_2$ loading is justified. Optimized sample No. 4 employs 20% less $TiO_2$ and contains blue tint to bring all color values (including blueness) in line with the No. 1 sample. Subsequent laboratory tests showed that clay bleaching has no adverse effect on product quality.

While the invention has been described above with respect to certain preferred embodiments thereof, it will be understood that various changes and modifications can be made without departing from the spirit and scope of the invention.

What is claimed is:

1. Aqueous coating composition suitable for coating roofing granules and comprising:
   (a) water;
   (b) kaolin clay;
   (c) sodium silicate;
   (d) titanium dioxide; and
   (e) bleaching agent selected from the group consisting of ammonium nitrate or nitrate of one or more group 1A metal, said bleaching agent being present in amounts between about 1 and about 4 wt. % based on the amount of kaolin clay in the coating composition.

2. Coating composition of claim 1 wherein the clay is present in amounts between about 45 and about 65 wt % based on total coating composition on a dry basis.

3. Coating composition of claim 2 wherein sodium silicate is present in an amount between about 30 and about 40 wt % based on total coating composition on a dry basis.

4. Coating composition of claim 3 wherein the bleaching agent is sodium nitrate.

5. Roofing granules comprising base mineral granules having coating comprising insolubilized reaction product of the coating composition of claim 4.

6. Coating composition according to claim 3 wherein the bleaching agent is ammonium nitrate.

7. Roofing granules comprising base mineral granules having coating comprising insolubilized reaction product of the coating composition of claim 6.

8. Roofing granules comprising base mineral granules having coating comprising insolubilized reaction product of the coating composition of claim 4.

9. Roofing granules comprising base mineral granules having coating comprising insolubilized reaction product of the coating composition of claim 1.

10. Roofing granules of claim 9 wherein the coating has been insolubilized by firing at a temperature between about 600° and about 1200° F.

* * * * *